United States Patent [19]

Talalay et al.

[11] Patent Number: 4,874,454

[45] Date of Patent: Oct. 17, 1989

[54] DECAL TRANSFER DEVICE

[75] Inventors: Anselm Talalay, Cleveland; Herbert H. Borsvold, Akron, both of Ohio

[73] Assignees: Roger Laudy; U.S. Printcraft, both of Copley, Ohio

[21] Appl. No.: 42,053

[22] Filed: Apr. 24, 1987

[51] Int. Cl.[4] .......................... H05B 1/00; B44C 1/17; B32B 31/00

[52] U.S. Cl. ................................ 156/359; 156/583.3; 156/240; 156/481; 219/243

[58] Field of Search ............... 156/230, 238, 239, 240, 156/289, 361, 218, 213, 481, 486, 488, 493, 490, 583.3, 359, DIG. 41, 156; 8/471, 467, 468; 100/212; 219/243, 244

[56] References Cited

U.S. PATENT DOCUMENTS

| | | | |
|---|---|---|---|
| 1,326,843 | 12/1919 | Brewer | 156/240 |
| 2,319,969 | 5/1943 | Besemer | 156/493 |
| 2,407,528 | 9/1946 | Antonson | 156/493 |
| 2,473,275 | 6/1949 | Brouns | 156/481 |
| 2,536,182 | 1/1951 | Humphrey | 156/445 |
| 2,695,721 | 11/1954 | Fairest et al. | 156/488 |
| 3,434,902 | 3/1969 | Bliss | 156/230 |

*Primary Examiner*—Michael W. Ball
*Assistant Examiner*—Louis Falasco
*Attorney, Agent, or Firm*—Oldham & Oldham Co.

[57] ABSTRACT

A device is shown for transferring sublimation decals to curved substrates such as the surfaces of ceramic mugs. The device employs a flexible transfer head which comprises a supported, flexible electrical heating pad which is made to envelop and press against the surface of the article onto which the decal design is to be transferred. The pad is then electrically heated, causing the sublimation dyes on the decal interposed between the pad and the surface of the article to be transferred from the backing sheet of the decal to the article's surface.

5 Claims, 4 Drawing Sheets

DECAL TRANSFER DEVICE

This invention relates to designs and design transfers. More particularly, this invention relates to decal designs and to the sublimation transfer of such designs by means of the application of heat and pressure. Specifically, this invention relates to the sublimation transfer of decal designs to curvilinear surfaces through use of a device employing a flexible design transfer head, as well as to the process of using such a device.

BACKGROUND OF THE INVENTION

For many years, articles bearing customized designs, or personalized with intitials, names, and the like, have been very popular with the public. Tee-shirts displaying the name of the wearer, catchy slogans, names of popular personages and like designs have become commonplace. Typically, the articles are personalized at the point of purchase, the purchaser choosing a particular design and the vendor transferring it immediately to the article selected. One method for decorating such articles comprises the use of sublimation transfer techniques involving the printing of a design on a paper backing sheet by conventional printing techniques with sublimation inks, and transferring such designs under heat and pressure to a substrate, usually a fabric. During the process, the sublimable dyes vaporize from the backing sheet and condense on the cooler substrate to form a brilliant image. In the case of a billed cap, for example, the process is accomplished by placing the cap on a curved anvil lined with a thin layer of sponge. The front surface of the decal is placed on the cap, and the design is transferred through the application of the heat and pressure produced by contacting the back of the decal with an arcuate pressure foot. In the case of a tee-shirt, the process is similar, except that the pressure foot is flat.

In addition to imprinting relatively flat, fibrous articles, there is also a considerable demand for decorating and personalizing curvilinear and other shapes made from inorganic materials, for instance, vitreous and ceramic articles. The personalization of tiles, tumblers, mugs, and similar objects has become especially popular. Such decorating is frequently done by means of decals prepared with silk-screening methods. After preparation, the design is freed from the backing paper by immersion in water, following which the decal is carefully slipped onto the object to be decorated, and the latter is then glazed and fired in a kiln. While the process produces a very durable design, the process is labor intensive, expensive, and it is inappropriate for point-of-sale use.

In an effort to overcome the deficiencies of the process described, an effort has been made to adapt the sublimation transfer process for use with ceramic materials, since it is quicker, less expensive, and lends itself to use at the point of sale. Adaptation of the sublimation process has been achieved by coating the article to be decorated with a thin film of a polymeric material capable of receiving and retaining the sublimation dyes. While the adaptation has met with some success, no device has yet been devised which permits the sublimation decals to be inexpensively and rapidly applied to ceramic articles with varying curved surfaces. A prior art device presently being used is severely limited with respect to the curvature and diameters of the cylindrical substrates that it can accept, and the device requires undesirably long cycle times. Furthermore, the surface area of the article to which the design can be transferred is restricted.

DISCLOSURE OF THE INVENTION

In view of the foregoing, one aspect of the invention is to provide a device and process which permits curvilinear articles to be decorated by means of sublimation decal transfers.

A second aspect of the invention is the provision of a device, and process for using it, which allows sublimation decal transfers to be effected on ceramic substrates having a substantially cylindrical shape.

Another aspect of this invention is to make available a sublimation decal transfer device which employs a flexible sublimation decal transfer head adapted to accept cylindrical shapes of varying diameter.

Still another aspect of the invention is to provide a transfer head that permits the transfer of a sublimation decal over the major portion of a ceramic mugs outer surface without undesirable leakage of vaporized ink around the edges of the decal.

A further aspect of this invention is the provision of a sublimation transfer process utilizing rapid cycle times.

An additional aspect of the invention is the provision of an inexpensive, relatively simple device and process which utilizes sublimation transfer decals.

The foregoing and other aspects of the invention are provided by a decal transfer device for accomplishing sublimation decal transfers through the use of heat and pressure which includes a flexible transfer head comprising: a flexible, electrical heating pad structure adapted for deformation about a decal transfer accepting, curvilinear substrate, and heating pad deformation means.

Yet other aspects are provided by a process for accomplishing sublimation decal transfers on a curvilinear substrate comprising forming a combination by placing a sublimation decal unit component against said substrate adjacent to the periphery of the substrate surface whereon the transfer is to be effected, thereupon applying pressure to the combination by placing said substrate, together with said decal unit component, in a flexible heating pad structure disposed in a loop configuration, and tightening said loop about said combination, and thereafter heating said structure until the desired sublimation transfer has been accomplished.

Still further aspects are provided by a process for accomplishing sublimation decal transfers onto a substrate having a curvilinear surface comprising applying pressure to the combination of a sublimation decal unit component positioned adjacent to the periphery of the substrate surface whereon the transfer is to be effected by forcing the decal unit covered periphery at substantially right angles against a deformably supported heating pad structure through the operation of substrate transport means located adjacent to said heating pad structure, whereby said structure is deformed into a shape that envelopes said decal unit covered periphery, and thereafter heating said structure until the desired sublimation transfer has been accomplished.

BRIEF DESCRIPTION OF THE DRAWINGS

The invention will be better understood when reference is had to the following drawings, in which like numbers indicate like parts.

BEST MODE FOR CARRYING OUT THE INVENTION

Figure 1:
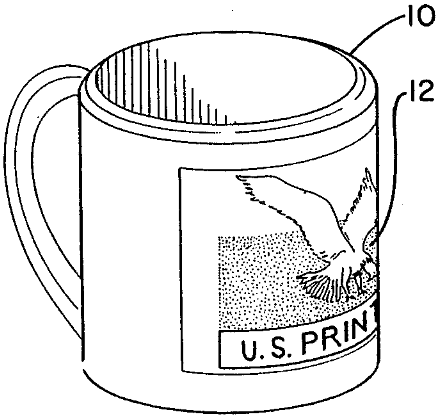
FIG. 1 is an isometric view of a ceramic mug decorated by means of a sublimation decal design which has been transferred thereon by the device and process of the invention.

FIG. 1 shows an isometric view of a ceramic mug 10, decorated with a design 12 transferred by means of a sublimation decal. Due to their relatively impervious surface, glazed ceramic articles do not lend themselves to the acceptance of sublimation dyes of the type employed on the decals used in the device and process of the invention. In order to desirably modify the surface of the ceramic article, it is typically coated with a layer of epoxy polymer capable of accepting the sublimation dye. An epoxy coating from about 0.5 to 1 mil in thickness is often employed. Preferably, the selected design is transferred on the front of the mug, opposite the handle, where it is readily visible.

Figure 2:
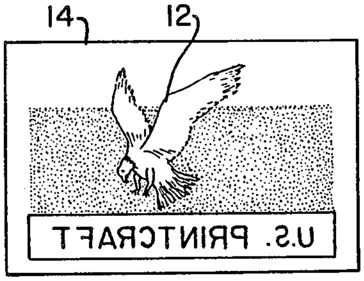
FIG. 2 is a plan view of a sublimation decal of the type employed by the device and process of the invention.

FIG. 2. shows a plan view of a sublimation decal 14 on which is printed the design to be transferred, 12. Such a decal, for example, includes a temporary backing sheet, which can be fiberglass cloth, plastic film, paper, thin metal foil, woven or non-woven fabric, etc., on which the design has been printed with sublimable inks including those of the organic base or water-soluble types. Such inks are applied by any of the conventional printing techniques including offset printing, lithographic or silk-screening techniques, the design layer having a thickness of from about 0.1 to about 3 mils. In the transfer process, heat and pressure are applied to the backing sheet, and the decal is heated to a temperature within the range of from about 200 degrees to 450 degrees Fahrenheit, under a pressure of from about 2 to 30 PSIG. When thus treated, the sublimable inks vaporize and condense on the substrate in initimate contact with the design decal, the ceramic surface of the substrate having previously been coated with a suitable polymer layer capable of accepting the inks.

Figure 3:
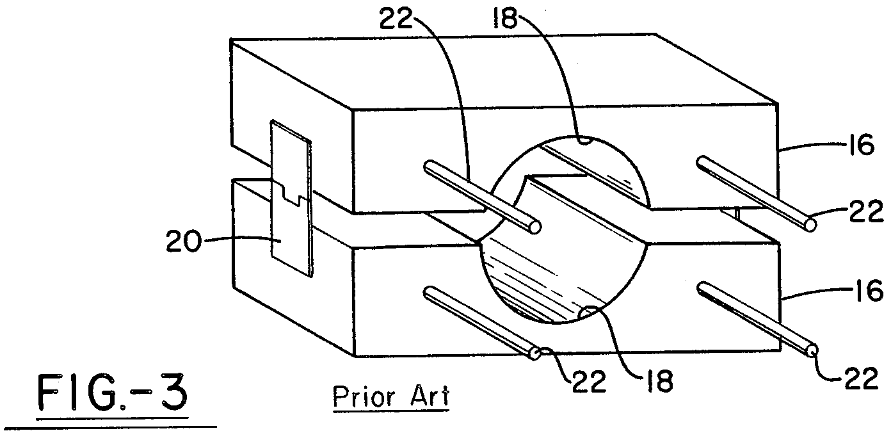
FIG.-3 Prior Art
FIG. 3 is an isometric view of a prior art device.

FIG. 3 shows an isometric view of a prior art device consisting of top and bottom heating platens 16, hingeably connected by hinge fastener 20. The platens 16 have a mug recess 18 incorporated therein, and are heated by contained heating elements disposed in the platens, connecting access to which is represented by the numeral 22. Unfortunately, the platens 16 entail considerable mass, and therefore, require an appreciable heating time to arrive at the required sublimation transfer temperature. A further disadvantage stems from the fact that the shape of the mug recess 18 is inalterable; consequently, it can accomodate only one size of mug, necessitating the provision of additional platens, suitably shaped, in instances where a variety of differently shaped substrates are to be decorated. In addition, where transfers are to be made to ceramic mugs, designs may only be imparted to the sides of the mug, since accomodation of the handle between the platens 16 limits the contact of the platens to the sides of the mug.

Figure 4:
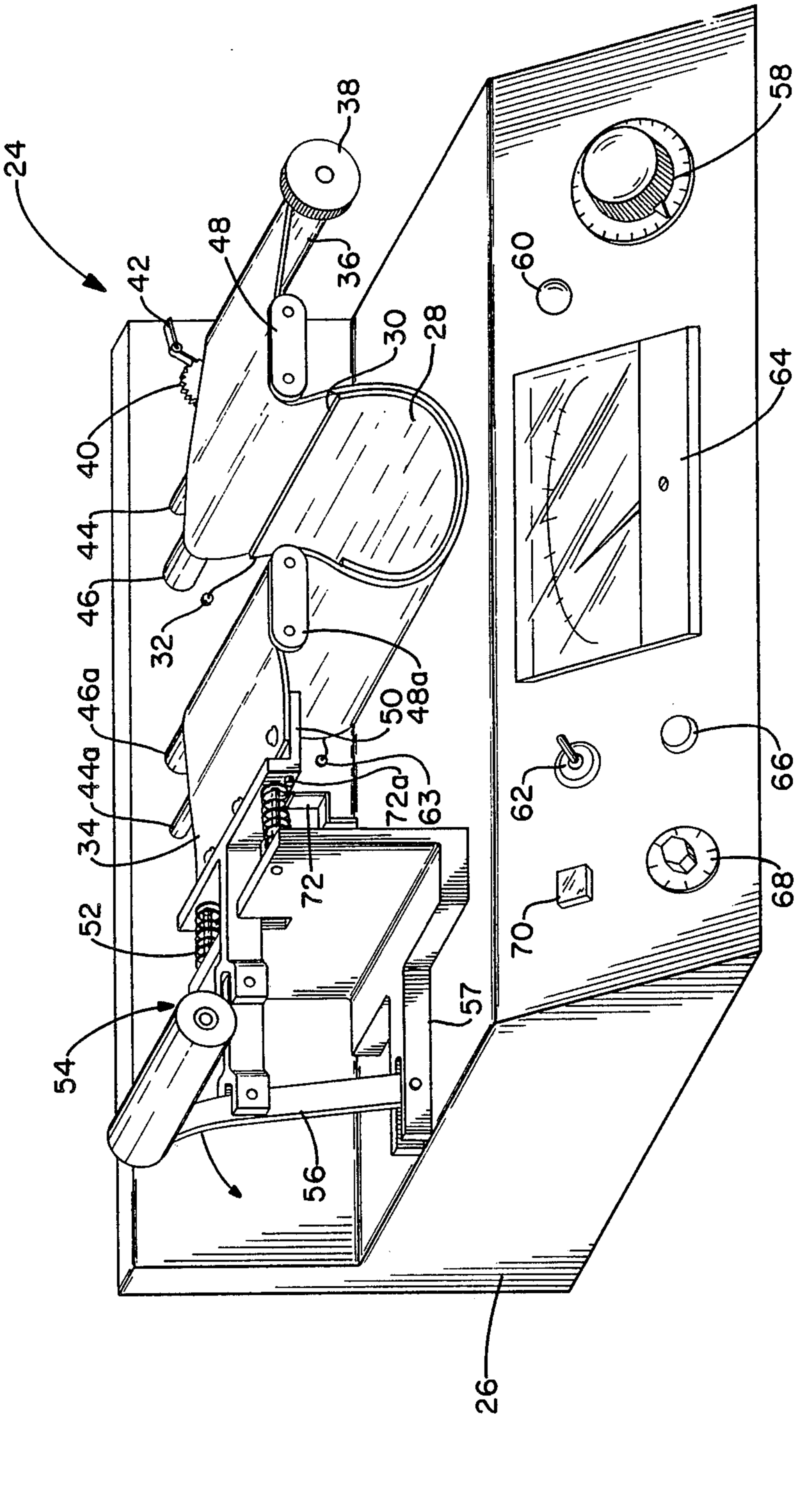
FIG. 4 is an isometric view of one embodiment of a device of the invention.

FIG. 4 shows an isometric view of one embodiment of the sublimation decal device of the invention, illustrated generally by the number 24. As shown, the device comprises a mounting support 26 which may take a shape different from that shown, on which the components of the device are mounted. The figure shows a flexible transfer head 28 disposed in a loop configuration, comprising a flexible platen heating head or pad 30, heated by electricity received through wiring 32. Heating pad 30 is shown in association with platen support belt 34, the latter preferably being slightly wider than the heating pad. Although the need for the platen support belt 34 could be obviated by suitably extending the length of platen heating pad 30, the use of the reinforcement provided by the pad support belt is preferred since among other things, such construction is safer and more economical. The platen heating pad 30 may simply be placed adjacent to the pad support belt 34, the operative, i.e., transfer activating portion adjacent to the decal design, being in the loop of the flexible transfer head 28, or the platen heating pad may be secured to the platen support belt by means of a suitable adhesive, such as a silicone adhesive, capable of withstanding elevated temperatures.

One end of the pad support belt 34 is attached to belt storage spindle or capstan 36, connected to mounting support 26, for adjustment of the length of the support belt, and therefore, of the size of the loop. After the mug to be decorated is placed in the loop of flexible transfer head 28, spindle adjustment knob 38 is rotated, winding the pad support belt 34 onto belt storage spindle 36 until the loop is disposed relatively closely about the periphery of the mug. The position of belt storage spindle 36 is maintained by pawl 42, which engages spindle ratchet gear 40, and need not be altered so long as the diameter of the mugs being processed is unchanged. The flexible transfer head 28 is disposed in a loop configuration between head rollers 46 and 46*a* attached to mounting support 26. Head rollers 46 and 46*a* are reinforced by support pins 44 and 44*a*, also attached to the mounting support, by means of support plates 48 and 48*a*. Pad support belt 34 is connected to tension anchor plate 50 which forms part of the tension linkage assembly, shown generally by the numeral 54, by means of which tension is applied to the pad support belt, resulting in radial pressure being applied to the mug disposed in the loop of flexible transfer head 28. Tension is induced in the linkage assembly 54 by means of an over-center movement of the tension handle 56 in the direction of the adjacent arrow. Tension handle 56 is mounted on linkage assembly support 57, connected to mounting support 26, the support, together with the other components shown, making up linkage assembly 54. Such movement results in the adjustable compression of springs 52, tending to maintain the handle in its tension producing position. The controls and instrumentation of the sublimation decal device 24 include an adjustable temperature controller 58, which controls the flow of current applied to the heating elements encapsulated in platen heating pad 30. Display light 60 indicates when current is flowing to the platen heating pad 30. The temperature of platen heating pad 30 is sensed by a thermocouple 63, and is indicated by temperature indicator 64. The device is also equipped with a protective circuit breaker 66, a timer control 68 which sets the timing cycle initiated by the closing of timer contact 72 against its counterpart contact 72a on tension anchor plate 50. This is indicated by timer light 70, interconnected with timer wiring 74.

When supported as shown in FIG. 4 by pad support belt 34, the platen heating pad 30 is normally constructed to be from about 6 to 20 inches in length, which is adequate to produce a loop in flexible transfer head 28 of from about 2 to 6 inches in diameter. A loop having such dimensions is sufficient to accomodate mug sizes normally encountered. While temperatures and cycle times will naturally depend upon the nature of the sublimation inks making up the design imprinted on the design decal, the transfer process is usually carried out at a temperature of from about 390 degrees to 450 degrees Farenheit, for a period of from about $\frac{1}{2}$ to 4 minutes. With respect to the sublimation decal device 24 shown in FIG. 4, it will be appreciated that the design and operation of tension linkage assembly 54 can be varied in accordance with techniques and designs known to those skilled in the art. Similarly, the instruments and controls used to operate the device can also be modified without altering the basic concept of the invention.

Figure 5:
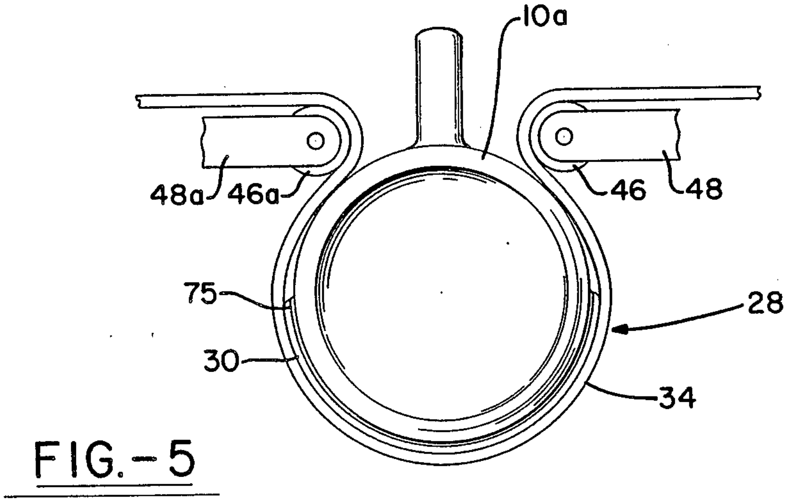
FIG. 5 is a front elevation of a brokenout portion of FIG. 4 showing a ceramic mug disposed in the flexible head of the device.
Figure 8:
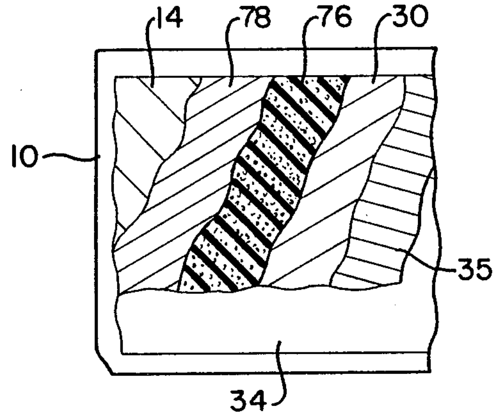
FIG. 8 is a partial side elevation of a sublimation decal unit component positioned against a substrate.

FIG. 5 illustrates a front elevation of that portion of FIG. 4 showing the flexible transfer head 28, disposed about a ceramic mug 10a. In the figure, the loop of flexible transfer head 28 is suspended between head rollers 46 and 46a, respectively. A sublimation decal unit component 75, which may contain components as described in FIG. 8, is located between mug 10a and the platen heating pad 30, supported by pad support belt 34. The pad support belt 34 has been tightened so that intimate contacting pressure is maintained between ceramic mug 10a and the sublimation decal unit component 75, thus assuring an effective transfer of the sublimation design.

The horizontal distance between head rollers 46 and 46a determines the periphery of the ceramic mug 10a on which an effective transfer of the design can be achieved. Ordinarily such distance will be maintained at from about $\frac{3}{4}$ to 1 $\frac{1}{2}$ inches, leaving a periphery adequate for the transfer of a design over the front and most of the side area of the mug. The platen heating pad 30 can comprise spaced electrical resistance heating wires, frequently connected in series, or an etched foil encapsulated in a layer of high temperature polymer. Typically, an electric wiring density is provided which will produce from about 2 $\frac{1}{2}$ to 30 watts per square inch over the surface of the platen heating pad. The encapsulation material may be selected from any of the materials commonly used for such purpose including polyimids, Dupont's "Kapton" or "Nomex", silicone rubber, and other equivalent materials. Silicone rubber is preferred, however, if desired reinforced with a layer of woven fiberglass.

Figure 6:
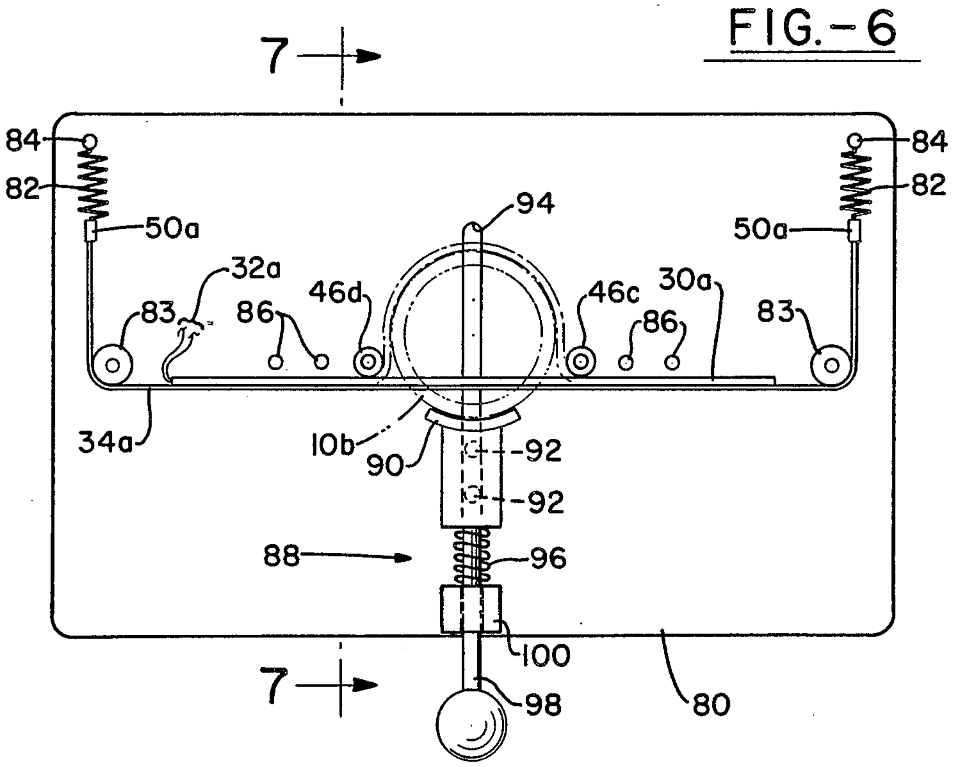
FIG. 6 is a top plan view of a further embodiment of the device of the invention.

FIG. 6 is a plan view of an additional embodiment of the invention in which the platen heating pad 30a, electrically connected by pad wiring 32a, and supported by pad support belt 34a, is disposed in a "hammock" flexible transfer head arrangement. As shown in the figure, pad support belt 34a is passed about rollers 83, mounted on support base 80, and attached to tension anchor plates 50a, which in turn are attached to anchor pins 84 by means of tension springs 82. A pressure assembly, shown generally by the numeral 88, comprises a pressure plate 90, having two guide pins 92 extending from the lower side thereof, which is attached to handle 98. The handle 98 is adapted to slide through, and be secured by handle guide 100, while guide pins 92 are slidably moveable in guide slot 94. A spring 96 functions to urge pressure plate 90 against a mug 10b, shown in phantom outline, forcing the mug against the platen heating pad-pad support belt combination, deforming the combination, also shown in phantom outline, about movable head rollers 46c and 46d. The deformation thus achieved, assures pressurized contact of the combination with the periphery of the mug on which the design is to be transferred. When mugs of larger diameter are to be processed, head rollers 46c and 46d are moved to whichever of the roller insert holes 86 are appropriate to accomodate the larger mug. While a spring urged pressure plate type pressure assembly is shown, other methods may also be used to deformably force the mug against the platen heating pad-pad support belt combination, 30a–34a. Although the angle may vary somewhat, it has been found of advantage to force the mug 10b against the platen heating pad-pad support belt combination at an angle of about 90 degrees, as shown in the figure.

Figure 7:
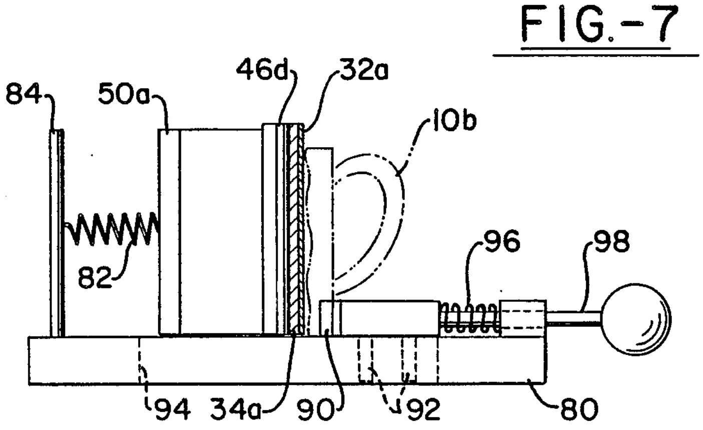
FIG. 7 is a cross sectional view of the embodiment of FIG. 6 along line 7—7.

FIG. 7 shows a sectional view of the embodiment of FIG. 6 through line 7—7. Mounted on support base 80 is shown pressure plate 90, attached to handle 98, the whole being slidably secured by handle guide 100. Spring 96 urges the pressure plate 90 against mug 10b, shown in phantom, pushing the latter deformably against the platen heating pad-pad support belt combination, 30a–34a. Head roller 46d supports the combination, while pad support belt 34a, attached to tension anchor plate 50a, is connected to anchor pin 84 by spring 82. Guide slot 94, in support base 80, is shown with guide pins 92 slidably disposed therein. The heating pad wiring 32a attached to the platen heating pad is also illustrated. While the figure shows the combination of the pad support belt 34a with platen heating pad 30 held in a deformable planar configuration by components including rollers 83, headrollers 46c and 46d, and springs 82 attaching the pad support belt to anchor pins 84 by attachment with tension anchor plates 50a, other equivalent systems can also be employed for the purpose.

FIG. 8 illustrates the partial side elevation of the operative sublimation decal unit components positioned against a substrate. The figure shows a mug 10 adjacent to, in the order recited, a transfer decal 14, a heat distribution septum 78, a pressure cushion 76, a platen heating pad 30, and a pad support belt 34. While use of the transfer decal 14 by itself will produce the desired design transfer in the device and process of the invention, its association with pressure cushion component 76, by itself, or in combination with heat distribution septum component 78—the decal by itself or together with one or both such other components sometimes being termed a sublimation decal unit component—will produce particularly good design transfers. It has been found, for example, that when a thin sheet of highly heat conductive metal foil such as aluminum, copper, or the like, desirably thin, i.e., in the neighborhood of 0.003 inches thick, particularly even heat transfer to all portions of the decal is achieved, activating substantially all of the sublimation dyes on the decal. When so employed, the foil can be fastened to the surface of the heating pad 30, adhesively or otherwise, in a single piece, or it may be divided or segmented into a plurality of narrow strips placed transversly to the direction in which the pad is to be bent to facilitate bending without puckering. Furthermore, the presence of the pressure cushion 76 assures that a uniform pressure will be applied over the entire surface of the decal, further benefitting the design transfer. Such pressure compensates for slight surface irregularities in the ceramic substrate, including slight excentricities, high and low spots, and the like. When a pressure cushion 76 is employed, it may be formed from any soft, spongy material capable of withstanding the temperatures to which it is subjected. A silicone sponge cushion of from about 1/16 to 3/8 inch has been found to be especially useful for the purpose. Such sponge can be of the open or closed cell type, although the former is preferred because of its reduced tendency to permanently "set" under heat and pressure. If desired the pressure cushion 76 may be placed between heating pad 30 and the transfer decal 14; however, better heat transfer is obtained when the cushion is placed between the support belt 34 and heating pad 30.

It has also been found to be of advantage to insert a curved sheet or sleeve of springy material such as steel or phosphorbronze, 35 of FIG. 8, for example, about 0.015 inch thick, between the support belt 34 and the heating pad 30. This allows the loop to retain an open conformation, facilitating the easy insertion of mugs. Typically, the sheet is formed in a length suitable to provide a diameter slightly larger than that of the largest mug to be processed. Coating of the interior surface of the heating pad 30, with, for instance, a thin layer of Teflon, is desirable since it allows the sheet to shift accommodatingly relative to the heating pad, when tension is applied to the support belt 34.

To avoid any possibility of the escape of ink vapors along the edges of decal 14 it has been found to be advantageous in some instances to extend the width of the pressure cushion 76 and of the support belt 34 beyond that of the heating pad 30, thereby assuring that the extremities of the decal are held firmly against the mug. Furthermore, in the event that the decal 14 extends to the upper edge of a mug having a tapered edge, it is sometimes of benefit to provide the decal with scalloped, V-shaped cuts along its edge adjacent to the taper so that such edge can adapt itself to the tapered shape.

Instead of a "passive" pressure distribution component such as a cushion 76 made of sponge rubber, employed in conjunction with the pressure producing components and assemblies previously described, it has also been found that an "active" elastic pressure element can be employed to provide the necessary pressure to a decal held against the mug. Such active pressure element can comprise an inflatable pneumatic rubber bladder similar to the bladder in the cuff of a blood pressure measuring device. In such embodiment, the bladder, which is made of a heat resisting material, is positioned to envelop the decal-mug combination in the same way that a blood pressure cuff envelops the arm of the person whose blood pressure is being taken.

Figure 9:
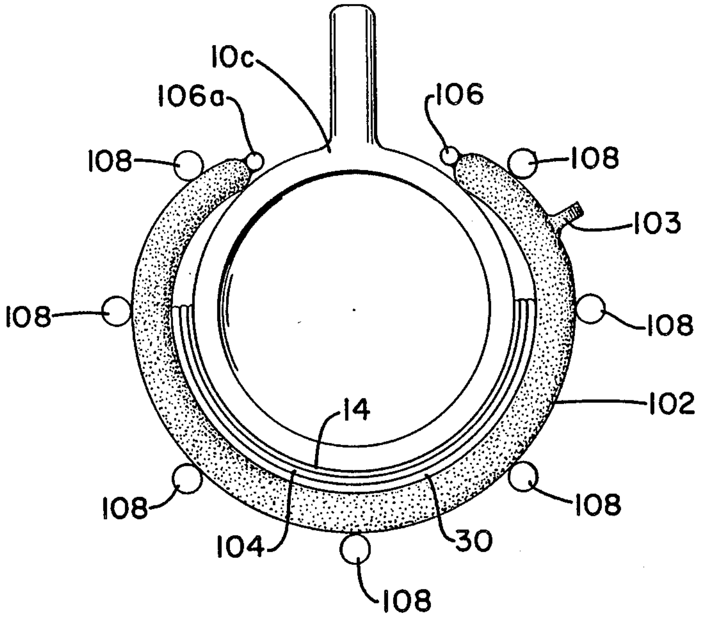
FIG. 9 is a front elevation of a still further embodiment showing a ceramic mug disposed in a pneumatic bladder.

The embodiment employing an active pressure element is shown in FIG. 9, in which a bladder 102, pneumatically filled through tube 103, presses a decal 14, a laten heating pad 30, and optionally, other components of the type previously described such as a heat distribution system, a spring sleeve, and the like, 104, against a mug 10*c*. The bladder 102 is attached to pins 106 and 106*a*, and is held in a circulr configuration by pins 108.

While in accordance with the patents statutes, a preferred embodiment and best mode has been presented, the scope of the invention is not limited thereto, but rather is measured by the scope of the attached claims.

What is claimed is:

1. A printing device for accomplishing sublimation design transfers through the use of heat and pressure which includes a flexible transfer head comprising:

a flexible heating pad structure adapted for deformation about a sublimation design accepting, curvilinear substrate to provide heat and pressure to a sublimation design during deformation, and heating pad deformation means, wherein said heating pad structure comprises a laminate structure which includes a thin flexible heated sheet and a pad support belt, said structure being disposed in a loop configuration formed between two spaced heating pad structure supports which are stationary during said deformation, wherein said heating pad deformation means comprises means for tightening said loop about said substrate, wherein the curvilinear substrate comprises a substantially cylindrically shaped substrate, while said stationary, spaced heating pad structure supports comprise support members spaced apart from each other at a distance less than the diameter of said cylindrically shaped substrate, and said structure covers more than 180 degrees of the cylindrically substrate's surface, and wherein means are provided for adjusting the size of the loop prior to tightening said tightening means about said cylindrically shaped substrate.

2. A device according to claim 1 wherein said heating pad structure is a laminate structure that includes a thin flexible heating sheet comprising a plurality of electrical resistance wires embedded in an encapsulated medium, wherein said heating sheet and said support belt are wider and longer than the sublimation design to be transferred.

3. A device according to claim 1 wherein said heated sheet and said support belt are wider and longer than the sublimation design to be transferred.

4. A device according to claim 1 wherein said tightening means comprises a belt anchoring member located adjacent to one end of the loop, to which one end of the support belt is attached, and belt tensioning means located adjacent to the other end of said loop capable of applying a pulling force on said belt parallel to the longitudinal axis of the belt, and in a direction away from said anchoring member, thereby tightening the loop about a cylindrically shaped substrate placed therein.

5. A device according to claim 1 wherein said laminate structure includes a metallic heat distribution septum, said septum also being wider and longer than the sublimation design to be transferred.

* * * * *